Aug. 27, 1935.  E. F. REINHARDT  2,012,546
ELECTRIC GRIDDLE
Filed July 30, 1932   2 Sheets-Sheet 1
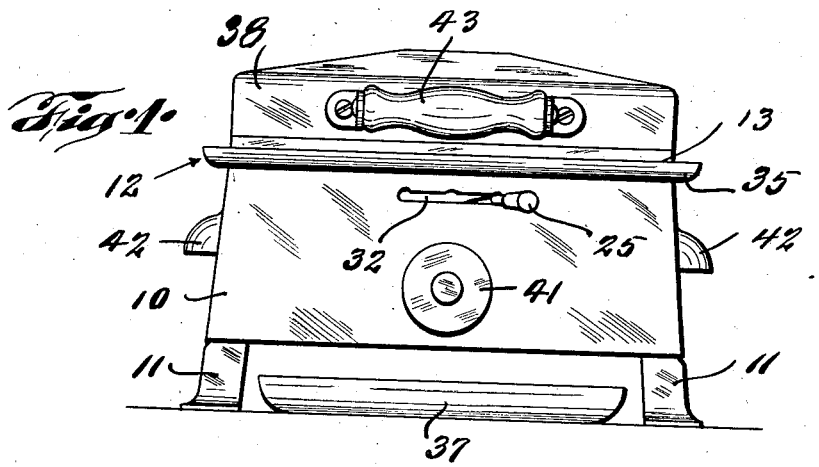
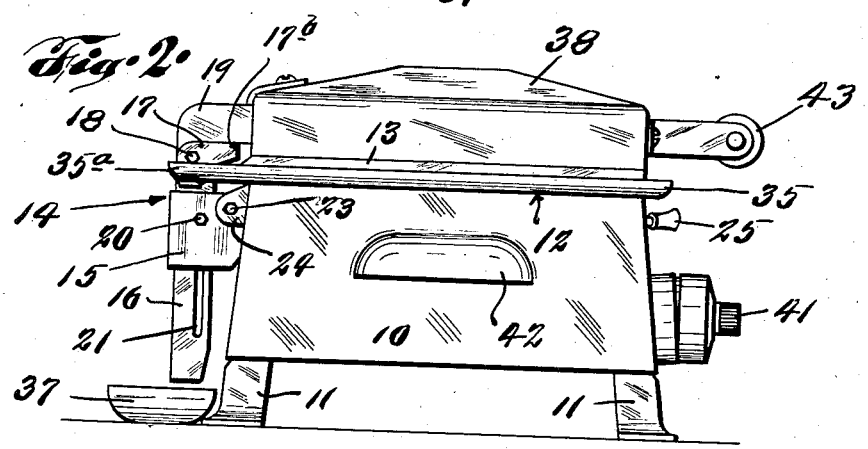
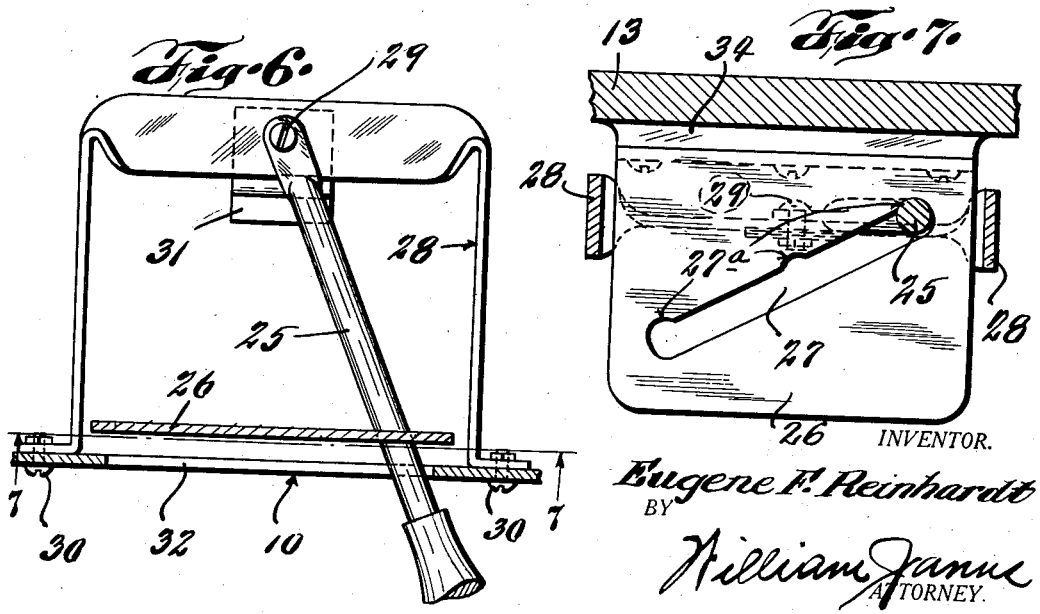
INVENTOR.
Eugene F. Reinhardt
BY
William Janne
ATTORNEY.

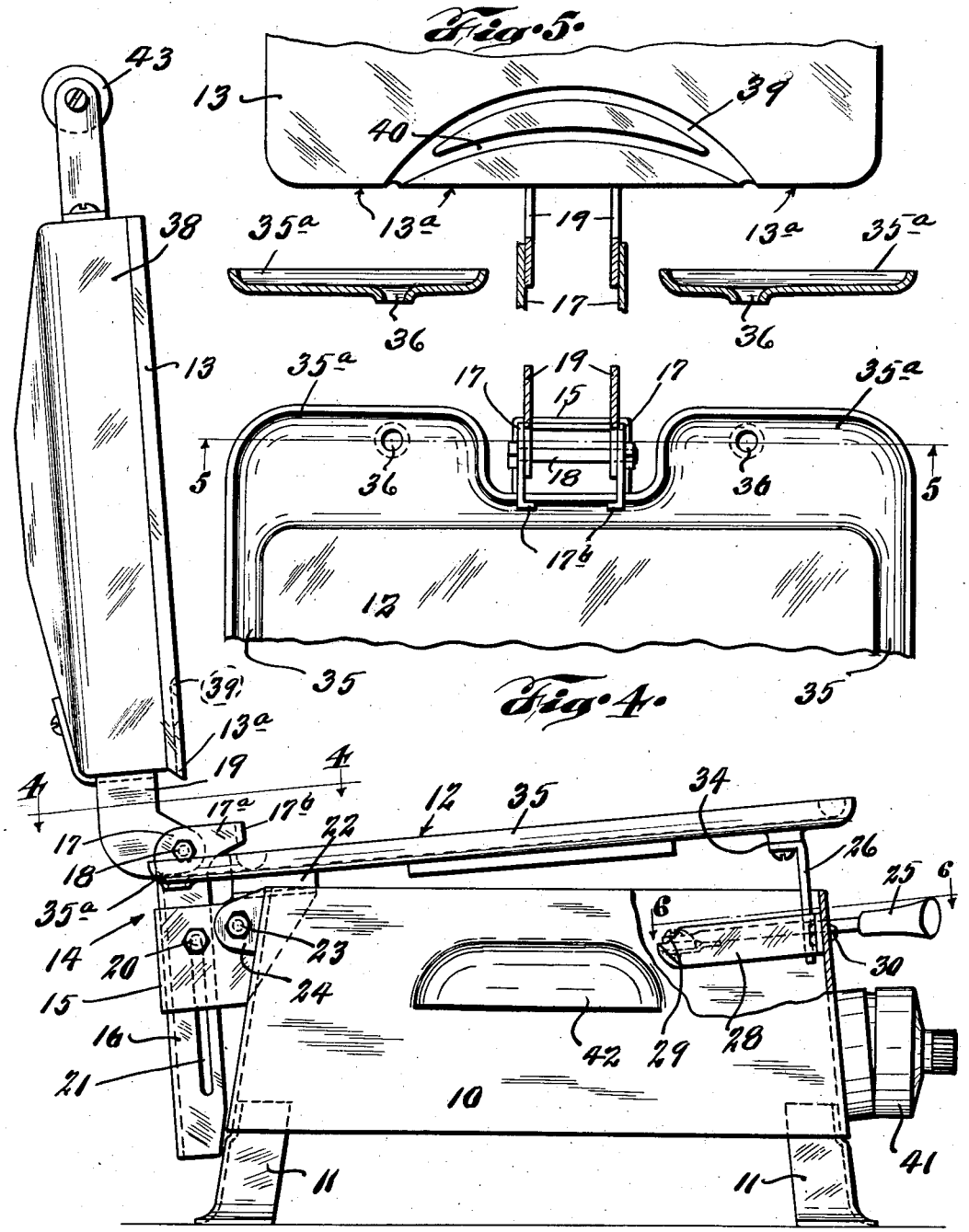

Patented Aug. 27, 1935

2,012,546

UNITED STATES PATENT OFFICE 2,012,546

ELECTRIC GRIDDLE

Eugene F. Reinhardt, St. Louis, Mo., assignor to Joseph Pavelka, St. Louis, Mo.

Application July 30, 1932, Serial No. 627,087

5 Claims. (Cl. 53—5)

This invention relates to new and useful improvements in electric griddles, the primary objects of the invention being the provision of a griddle which can be tilted from a horizontal position into an inclined position by the movement of a suitable handle.

Other objects of the invention are to provide an electric griddle which is pivotally mounted near one end on a suitable base and which has its other end supported by means of a slot and pin connection, one of which is fixed to said griddle and the other mounted on said base for movement in a horizontal plane whereby the actuation of the latter moves said griddle in a vertical plane on said pivot.

Still other objects of the invention are to provide an electric griddle wherein the lower grid member is provided with a rear trough extension for receiving drippings from the upper grid member when the latter occupies open position.

With these and other objects in view, my invention consists in certain novel features of construction and arrangement of parts, hereinafter more fully described and claimed, and illustrated in the accompanying drawings, in which—

Figure 1 is a front elevational view of my improved griddle.

Figure 2 is a side elevational view thereof.

Figure 3 is an enlarged side elevation showing the upper grid member in upright position and showing the lower grid member in tilted position.

Figure 4 is a fragmental horizontal cross section taken on line 4—4 of Figure 3.

Figure 5 is a vertical cross section taken on line 5—5 of Figure 4.

Figure 6 is an enlarged horizontal cross section taken on line 6—6 of Figure 3.

Figure 7 is a vertical cross section taken on line 7—7 of Figure 6.

Referring by numerals to the accompanying drawings, 10 indicates a base open at top and bottom and having legs 11. A lower grid member 12 is supported on said base in horizontal position and an upper grid member 13 rests on said bottom or lower grid and is pivotally mounted on base 10 by a hinge 14 whereby said upper grid 13 can be moved into open position as shown in Figure 4.

This hinge 14, which is of the type disclosed in United States Patent No. 1,837,232, permits the upper grid to be supported parallel with the lower grid and in spaced relation therewith so that sandwiches and other foods of various thicknesses can be toasted or cooked simultaneously by both grids.

Briefly described, this hinge consists of a stationary member 15 substantially rectangular in cross section and secured to the rear wall of base 10 and a movable hinge member 16 substantially U-shape in cross section and of sufficient length and slidably mounted for movement within said stationary member.

The upper ends 17 of the side walls of this movable member 16 have pivotally mounted thereon by a pin 18 the ends of a bracket 19 which is fixed to and projects outwardly from the upper grid 13.

The end and side walls of said slidable hinge member 16 are in contact with the corresponding walls of said stationary member 10. The two members are held together by a pin 20 carried by the stationary member and engaging slots 21 formed vertically in the side walls of the movable member 16. Thus the engagement of said pin with the slots prevents removal of the movable member 16 from member 15 and forms a stop limiting the downward movement of said member 16 and the upper grid 13.

The upper ends 17 have formed integral therewith inward extensions 17a, the ends 17b of which are bent at right angles toward each other and are adapted to be engaged by and support the horizontal portions 19a of brackets 19 so that the upper grid 14 is maintained at all times parallel with the lower grid 12.

The construction of hinge 14 is such that the upper grid 13 can be adjusted upwardly in spaced relation with lower grid 12 and supported in such position by means of said hinge. When the grid 13 occupies horizontal position in spaced relation with the lower grid 12 the weight of said grid 13 causes the movable member 16 to tilt on pin 20 whereby the lower portion of the stationary member 15 frictionally engages the end wall of movable member 16 and holds it and grid 13 in raised position. This tilting of the member 16 is accomplished by virtue of the fact that the weight of the grid 13 is transmitted to said movable member 16 at a point disposed inwardly of hinge 18 and on the opposite side of the end wall of member 16, namely, the inturned end 17b.

The lower grid 12 is provided on its underside near its rear end with a downwardly extending bracket 22, the ends of which are pivotally supported by a pin 23 on lugs 24 extending rearwardly from the rear wall of base 10. Thus the lower grid 12 can be tilted to facilitate the draining of the juices and grease therefrom.

To accomplish this tilting movement, I mount on said base 10 a handle 25 for movement in a horizontal plane and on the forward end of said lower grid 12 a depending bracket or arm 26 having formed therein an obliquely disposed slot 27 which is traversed by said handle. Thus when said handle occupies home position at the right-hand side of the grid it traverses the upper right-hand end of said slot. As said handle is moved toward the left, it causes, by virtue of its engagement with slot 27, upward movement of the front end of grid 12 so that the latter occupies tilted position.

Handle 25 extends into the base 10 and has its inner end pivotally mounted to a support 28, as indicated at 29. This support is, in the instant case, of U-shape disposed horizontally and has its ends secured to the front wall of base 10, as indicated at 30. This support is provided with a bracket 31 which extends under said handle near the inner end thereof and forms a support therefor. The outer end of said handle extends outwardly from said base through a slot 32 formed horizontally in the front wall thereof and said handle is supported on the lower edge of said slot.

The bracket 26 is secured to the underside of lower grid 12, as indicated at 34, and extends downwardly into the base and inwardly of the front wall thereof. The slot 27 which is formed in said bracket is arranged in a plane substantially parallel and spaced inwardly from the plane of slot 32. When the grid 12 occupies horizontal or normal position, the upper end of slot 27 is disposed substantially in coaxial alignment with the righthand end of slot 32. When the grid 12 occupies its uppermost position, the lower end of slot 27 is disposed substantially in coaxial alignment with the lefthand end of said slot 32. Preferably said slot 27 is provided at its ends and at one or more points intermediate thereof with upwardly presented notches 27a which serve as seats for the handle 25 and lock said grid 12 in tilted position.

The lower grid member 12 is provided with an integral upwardly presented trough 35 which surrounds the face of said grid and receives the grease or juices released thereon. The rear portion 35a of said trough is extended a suitable distance rearwardly so as to extend under the vertical plane of the lower rear edge of the upper grid 13 when the latter occupies upright position (see Fig. 4).

These trough extensions 35a are located to each side of hinge 14 and do not interfere therewith as sufficient clearance is provided therebetween. Each trough extension 35a is provided with a downwardly presented spout or aperture 36 through which the liquid is discharged from the trough into a suitable container located therebelow. This container may be in the form of individual cups or a pan 37.

The rear edge of the upper grid 13 is formed beveled as indicated at 13a so that when said grid occupies open or upright position, the lowermost point on said edge is adjacent to the face of the grid and away from the grid casing 38.

The purpose of this is to prevent the passage of grease and other liquid from the grid to said casing and to said hinge and to cause such grease to drip into said trough extensions 35a.

In order to prevent dripping from the upper grid onto the hinge portion and between the trough extensions 35a, the face of the grid 13 is provided above said hinge and adjacent to the edge 13a with an arcuate groove 39 which spans the space between said trough extensions and has its ends terminating in an edge 13a at points thereabove. The grease or liquid from the central portion of the face of grid 13 collects in this groove and is diverted thereby to each side of the hinge and drains through the ends of said groove into said trough extensions. Preferably a second groove 40, whose arc is of larger diameter than the first groove, is formed in the segmental face portion defined by groove 39. This second groove serves as an additional drain and opens into the first groove in the ends thereof.

Both grids are heated by suitable heating elements which may be of any standard construction and can be connected to an outlet of electrical current in the usual manner.

The base 10 is provided with a switch 41 for turning on and off the electric current. Handles 42 are formed on said base whereby the appliance can be conveniently carried. The casing 38 is provided at its forward end with a handle 43 by means of which the upper grid can be actuated into upright position or adjusted in spaced parallel relation with the lower grid.

Handle 25 is conveniently located and can be easily operated to raise and lower the lower grid without disturbing the base 10. As this lower grid can be readily tilted and both grids are efficiently drained, there is no danger of spilling hot grease onto the table on which the appliance may be located. Furthermore, the quick and easy removal of the grease from the grids insures a more perfect cooking of the food.

My improved grid can be easily operated, is of sturdy construction, and is highly efficient in performing its intended functions.

While I have shown and described herein the preferred form of my invention, it is obvious that various changes in the construction and arrangement of parts of my improved electric grid can be made and substituted for those herein shown without departing from the spirit of my invention.

I claim:

1. In an electric griddle, the combination of a base, a grid normally supported thereon in a horizontal plane, a hinge fixed to one end of said grid and to said base; a manually operable lever movably mounted in said base, and a bracket fixed to the other end of said grid and extending downwardly into said base and having a slot and pin connection with said lever whereby said grid is movable by said lever into raised tilted position or into normal horizontal position.

2. In an electric grid, the combination of a base, an upwardly presented grid movably attached thereto and provided with an upwardly presented marginal trough, said trough being provided adjacent to one end of said grid with a downwardly presented draining aperture, and means in said base and engaging said grid for tilting the latter on said base on an axis arranged adjacent to said draining aperture whereby liquid is drained for said grid by means of said trough and said draining aperture.

3. In an electric cooking device, a base, a pair of cooperating grids, a hinge for pivotally interengaging said grids and supporting them on said base, the lower grid having an upwardly presented marginal groove provided with a drain opening adjacent to said hinge, and manually operable means in said base operatively associated with said lower grid for moving the latter from its normal horizontal position to an inclined position tion to permit draining of liquid from said groove.

4. In a cooking device of the character described, the combination of a base, a cooking grid having a drain, means for movably supporting said grid on said base whereby said grid can be tilted to slope toward said drain, and manually operable means in said base for normally maintaining said grid in a horizontal position and operable to tilt said grid.

5. In a cooking device of the character described, the combination of a base, a pair of cooperating cooking grids, a hinge for connecting said grids together, means for supporting said hinge on said base, and manually operable means arranged in said base and engaging the lower one of said grids at a point remote from said hinge for normally supporting said lower grid in a horizontal position and operable to move said lower grid into a position inclined from horizontal.

EUGENE F. REINHARDT.